R. F. SEDGLEY

Jan. 3, 1933. RIFLE LOADING MECHANISM Re. 18,706

Original Filed July 31, 1931

INVENTOR.
Reginald F. Sedgley
BY
Herbert S. Fairbanks
ATTORNEY.

Reissued Jan. 3, 1933 Re. 18,706

UNITED STATES PATENT OFFICE

REGINALD F. SEDGLEY, OF PHILADELPHIA, PENNSYLVANIA

RIFLE LOADING MECHANISM

Original No. 1,850,729, dated March 22, 1932, Serial No. 554,332, filed July 31, 1931. Application for reissue filed April 9, 1932. Serial No. 604,342.

There has recently come into use a high speed twenty-two caliber cartridge having a speed of twenty-five hundred feet per minute and a blank range of approximately two hundred yards. In order to avoid the necessity of designing a new rifle to handle these cartridges I have devised novel means whereby the higher caliber rifle movements can be adapted to utilize these high speed cartridges, the barrel being replaced by one which is adapted to receive a twenty-two caliber cartridge.

With the above and other objects in view, as will hereinafter appear, my invention comprehends novel loading mechanism for rifles.

It further comprehends novel rifle loading mechanism wherein the bolt is provided with a novel construction and arrangement of a cartridge pick-up.

It further comprehends a novel magazine and novel means for securing it to the floor plate.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Similar numerals of reference indicate corresponding parts.

Figure 1:
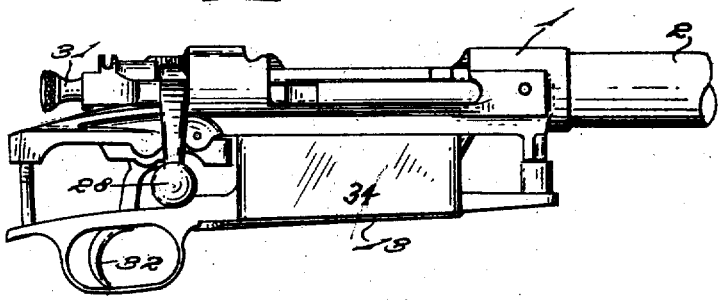
Figure 1 is a side elevation of a portion of a rifle, embodying my invention.

Referring to the drawing:

1 designates the breech of a light weight rifle embodying my invention. 2 designates the barrel having a bore to receive a .22 cartridge. 3 designates the bolt which is constructed and operates in the conventional manner except for my novel cartridge pick-up 4. The bolt is slotted as at 5 to receive the cartridge pick-up, and the rear end of such slot terminates in a rounded recess 6 adapted to receive the rounded head 7 connected with the body portion of the cartridge pick-up by a neck 8. The extractor ring 33 which is seated in an annular groove in the bolt extends over the head 7 so that the cartridge pick-up is pivotally supported at its rear end. A spring 9 between the bolt and the cartridge pick-up tends to move the forward end of the latter outwardly. The bolt and cartridge pick-up are recessed to receive and position the free ends of the spring.

The conventional magazine is of such size that it cannot be used with a .22 cartridge. It therefore becomes necessary to redesign it for this purpose. The magazine consists of a casing 10 preferably rectangular in contour and provided with a rearwardly extending base flange 11 which extends beneath a spring metal clip 12 having one end secured to the floor plate 13 by means of a fastening device 14. The magazine has within it a spring 15 having a zig zag contour, and the forwardly extending lower portion is adapted to pass beneath the inwardly directed flanges 16 of the floor plate. The spring 15 at its upper end terminates in a forwardly extending portion which abuts against the downwardly directed forward flange 16 of the cartridge follower 17 which has a similar flange 18 at its rear end. Opposite side walls of the magazine are inwardly deflected at their upper ends as at 19 to overhang the cartridge follower and limit its upward movement. 20 designates a stop and magazine cover in the form of a bent spring, the lower end of which is secured to the magazine by a fastening device 21. The spring extends rearwardly and upwardly and is then deflected forwardly and upwardly and terminates in a downwardly directed flange 22 which bears against the rear wall of the magazine which is cut away at its upper end as at 23. The forward upper end of the magazine is cut out as at 24. The cartridge follower has a raised rib 25. The breech has the rounded shoulder 26 which directs a cartridge when fed forwardly by the cartridge pick-up to the bore of the barrel. 27 are the conventional locking lugs on the bolt and 28 is the bolt handle. 29 is the conventional extractor carried by the bolt. 30 designates the cartridge.

The operation will now be apparent tc those skilled in this art and is as follows.

Figure 2:
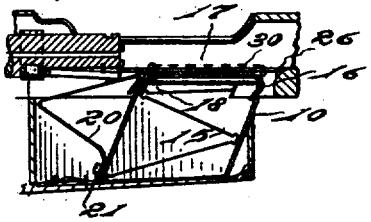
Figure 2 is a sectional elevation of the loading mechanism.
Figure 3:
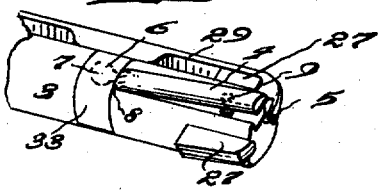
Figure 3 is a perspective view, showing more particularly, the forward end of the bolt and the cartridge pick-up.
Figure 4:
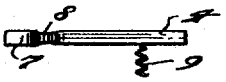
Figure 4 is a side elevation of the cartridge pick-up and its spring.
Figure 5:
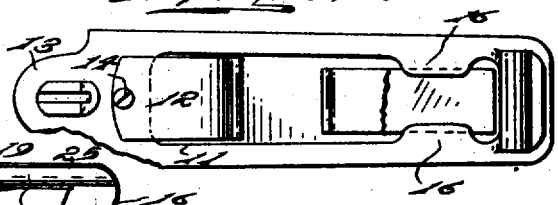
Figure 5 is a plan view, partly broken away, showing more particularly the manner of securing the magazine in position.
Figure 6:
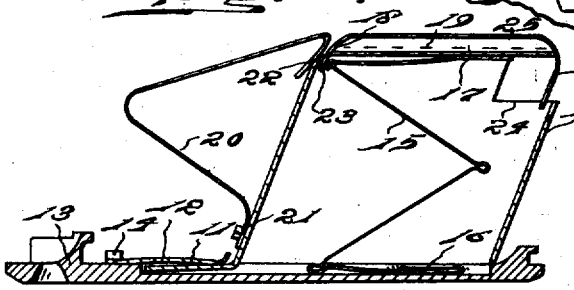
Figure 6 is a sectional elevation of the magazine.

Assuming that the cartridges are in the magazine, the bolt handle 28 is raised and the bolt 3 retracted. The bolt 3 is then moved forwardly. The rim of the cartridge is resting against the stop 22 and as the bolt advances the upper end of the spring 20 is pressed downwardly by the cartridge pick-up 4 so that the forward end of the latter contacts with the rim of a cartridge and moves the latter forwardly with it. The forward end of the cartridge rides up on the shoulder 26, see Figure 2, and is directed into the bore of the barrel. The bolt handle 28 is now swung downwardly and the bolt is locked in position with the firing pin 31 ready to be released by the trigger 32.

It will be noted that the magazine housing 34 has connected to it the floor plate and thus forms an outer magazine within which is detachably mounted art cartridge magazine 10.

It will now be apparent that I have devised a new and useful rifle loading mechanism which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In a rifle loading mechanism, the combination with the bolt bodily rotatable into locked position and a fixed and stationary barrel, of a cartridge pick-up movably carried by said bolt and effective on the forward movement of the bolt to feed a cartridge into said barrel.

2. In a rifle loading mechanism, the combination with the breech, of a bolt bodily rotatable into locked position, a barrel fixedly connected with said breech, a cartridge pick-up movably carried by the bolt and effective on the forward movement of the bolt to feed a cartridge into said barrel, and a spring tending to move the free end of the cartridge pick-up away from said bolt.

3. In a rifle loading mechanism, the combination with the bolt having a slot opening through its forward end of a cartridge pick-up seated in said slot, an extractor ring retaining the rear end of said cartridge pick-up on the bolt, and resilient means tending to move the free end of said cartridge pick-up outwardly from the bolt.

4. In a rifle loading mechanism, a bolt having in its bottom a slot opening through its forward end, the rear end of said slot terminating in a rounded recess, a cartridge pick-up seated in said slot and having a head to enter said recess, means to retain said head in said recess, and a spring between said bolt and the cartridge pick-up and tending to move the forward end of said cartridge pick-up away from said bolt.

5. In a rifle loading mechanism, a magazine housing, a floor plate detachably connected therewith, a sub-calibre magazine insertable into said magazine housing and interlocked at its lower end and with said floor plate, a cartridge follower within said sub-calibre magazine, and a spring having one end engaging said cartridge follower and its opposite end interlocked with said floor plate.

6. In a rifle loading mechanism, a magazine housing, a floor plate detachably connected therewith, a sub-calibre magazine insertable into said magazine housing and interlocked at its lower end with said floor plate, a cartridge follower within said sub-calibre magazine, a spring having one end engaging said cartridge follower and its opposite end interlocked with said floor plate, and a resiliently mounted cartridge stop at the rear end of said sub-calibre magazine.

7. In a rifle loading mechanism, a magazine housing of normal calibre, a floor plate detachably connected with said housing, and a sub-calibre magazine insertable into said housing and connected with said floor plate.

8. In a rifle loading mechanism, a magazine housing of normal calibre, a floor plate closing the bottom of said housing and detachably mounted, a sub-calibre magazine housing having one of its walls detachably connected with said floor plate, a cartridge follower in said housing, and a spring to effect upward movement of said follower and having one end detachably connected with said floor plate.

9. In a rifle loading mechanism, a magazine housing of normal calibre, a floor plate covering the bottom of said magazine, a spring fixed to said floor plate, a sub-calibre magazine having means to pass beneath said spring and floor plate to retain the parts in assembled condition, a follower in said sub-calibre housing, a spring within said sub-calibre housing having one end portion bearing against said follower, and having its lower end portion interlocked with said floor plate, and a resilient cartridge stop carried by said sub-calibre magazine housing.

REGINALD F. SEDGLEY.